No. 669,033. Patented Feb. 26, 1901.
W. J. HAYES.
MENDER FOR BEER PIPES.
(Application filed Nov. 19, 1900.)
(No Model.)

Witnesses:
H. B. Davis.
John W. Drerow.

Inventor:
William J. Hayes

UNITED STATES PATENT OFFICE.

WILLIAM J. HAYES, OF BOSTON, MASSACHUSETTS.

MENDER FOR BEER-PIPES.

SPECIFICATION forming part of Letters Patent No. 669,033, dated February 26, 1901.

Application filed November 19, 1900. Serial No. 37,010. (No model.)

*To all whom it may concern:*

Be it known that I, WILLIAM J. HAYES, of Boston, in the county of Suffolk and Commonwealth of Massachusetts, have made certain new and useful Improvements in Menders for Beer-Pipes, of which the following is a description sufficiently full, clear, and exact to enable any person skilled in the art or science to which said invention appertains to make and use the same, reference being had to the accompanying drawings, forming part of this specification, in which—

Figure 1:
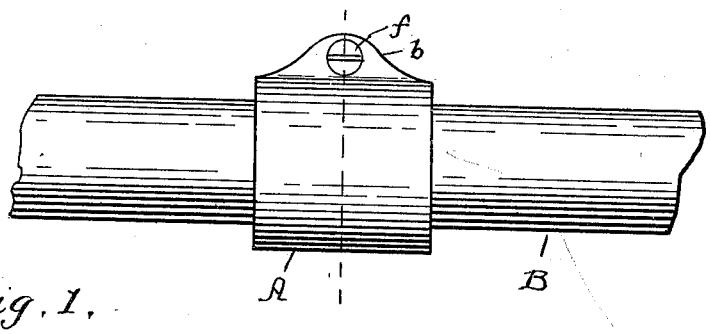
Figure 2:
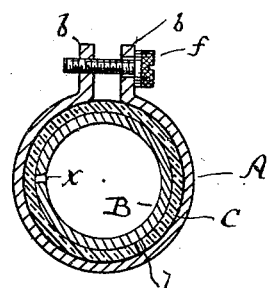
Figure 3:
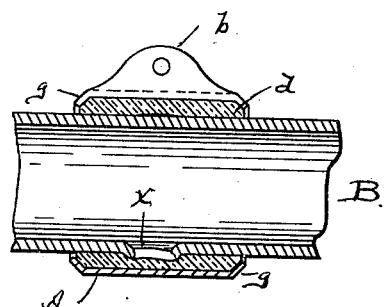

Figure 1 is an elevation of a section of lead pipe, showing my improved mender in position; Fig. 2, a vertical transverse section of the same; Fig. 3, a longitudinal section illustrating a modification, and Fig. 4 a sectional view of the packing or bushing.

Like letters of reference indicate corresponding parts in the different figures of the drawings.

My invention relates especially to a device for temporarily mending or stopping a leak in the lead pipe which connects beer or barrels containing other malt liquors with the tap or with an air-pressure supply. Frequently a hole is accidentally blown in such pipes and immediate repairs become necessary before artisans can be summoned to effect a permanent sealing. In accomplishing this I form an open cylinder A, of sheet-brass or other flexible metal, somewhat less in diameter than the pipe. This is provided at its edges with ears or lugs $b$, both of which are tapped and one screw-threaded to receive a take-up screw $f$. Inside this cylinder is disposed a rubber bushing cylindrical and split at $h$, Fig. 2.

In the use of the parts as thus far described when a break $x$ occurs in a pipe the bushing C, if felt, rubber, or other pliable material, is disposed around the pipe covering the aperture $x$. This is then encircled by the flexible metal cylinder A and its lugs $b$ connected by the screw $f$, whereby such cylinder may be made to compress the packing or bushing C so across the leak as to prevent flow therethrough from the pipe in a manner which will be readily understood by those conversant with such matters.

Figure 4:
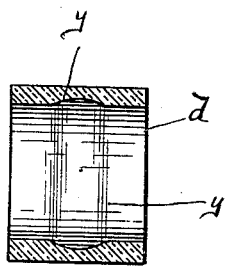

In the form shown in Figs. 3 and 4 the eyes of the cylinder A are crimped or flanged inward at $g$. The packing-ring $d$ has formed centrally in its inner face an annular groove $y$. The operation is the same as that described above. The advantages of this form are, however, that the crimped edges prevent expansion of the packing outwardly and render it more effective in stopping the leak-opening. Moreover, the groove $y$ will admit the ragged edges of the break $x$, (see Fig. 3,) prevent slipping on pipe B, and also add to the efficiency of the device.

Having thus explained my invention, what I claim is—

The split cylinder having lugs and inwardly-turned flanges in combination with the grooved split bushing and devices for connecting said lugs whereby the cylinder may be compressed against said bushing, substantially as and for the purpose specified.

WILLIAM J. HAYES.

Witnesses:
O. M. SHAW,
MELVILLE HAMMETT.